United States Patent
Ahn

(10) Patent No.: US 11,975,966 B2
(45) Date of Patent: May 7, 2024

(54) MODIFIED SULFUR AND PRODUCTION METHOD THEREOF

(71) Applicant: Phil Ho Ahn, Pocheon-si (KR)

(72) Inventor: Phil Ho Ahn, Pocheon-si (KR)

( * ) Notice: Subject to any disclaimer, the term of this patent is extended or adjusted under 35 U.S.C. 154(b) by 775 days.

(21) Appl. No.: 16/963,146

(22) PCT Filed: Jan. 20, 2020

(86) PCT No.: PCT/KR2020/000935
§ 371 (c)(1),
(2) Date: Jul. 17, 2020

(87) PCT Pub. No.: WO2021/149839
PCT Pub. Date: Jul. 29, 2021

(65) Prior Publication Data
US 2021/0221682 A1  Jul. 22, 2021

(51) Int. Cl.
*C01B 17/02* (2006.01)
*C04B 28/04* (2006.01)

(52) U.S. Cl.
CPC ...... *C01B 17/0243* (2013.01); *C01B 17/0221* (2013.01); *C04B 28/04* (2013.01); *C04B 2235/42* (2013.01)

(58) Field of Classification Search
CPC . C01B 17/0243; C01B 17/0221; C04B 28/04; C04B 2235/42; C04B 28/36; C04B 24/16; Y02W 30/91; C01P 2006/22
See application file for complete search history.

(56) References Cited

FOREIGN PATENT DOCUMENTS

| KR | 1020110037127 | | 4/2011 |
|---|---|---|---|
| KR | 20120096385 A | * | 8/2012 |
| KR | 1020140000160 | | 6/2014 |
| WO | 2015112490 | | 7/2015 |

OTHER PUBLICATIONS

Machine translation of KR20120096385A (Year: 2012).*
Smith et al (Crosslinker Copolymerization for Property Control in Inverse Vulcanization, Chemistry Europe, 2019) (Year: 2019).*
Smith et al (Sulfur-Containing Polymers Prepared from Fatty Acid-Derived Monomers: Application of Atom-Economical Thiol-ene/Thiol-yne Click Reactions and Inverse Vulcanization Strategies, Sustainable Chemistry, 2020) (Year: 2020).*
Hoefling et al (Sulfur-Based Polymer Composites from Vegetable Oils and Elemental Sulfur: A Sustainable Active Material for Li—S Batteries, Macromolecular Chemistry and Physics, 2017) (Year: 2017).*
Smith, Jessia A. et al., "Crosslinker copolymerization for property control in inverse vulcanization", Chemistry A European Journal, Jul. 8, 2019 (online publication date), vol. 25, pp. 10433-10440. Wiley Online Library.
Worthington, Max J.H. et al. "Laying waste to mercury: inexpensive sorbents made from sulfur and recycled cooking oils", Chemistry a European Journal, Aug. 30, 2017 (online publication date), vol. 23, pp. 16219-16230.

* cited by examiner

*Primary Examiner* — Colin W. Slifka
*Assistant Examiner* — Logan Edward Laclair
(74) *Attorney, Agent, or Firm* — Thomas M. Freiburger

(57) ABSTRACT

Provided are modified sulfur and a production method thereof, the modified sulfur including sulfur and a modifier, wherein the modifier is an unsaturated fatty acid-based modifier.

6 Claims, 3 Drawing Sheets

[Fig. 1]
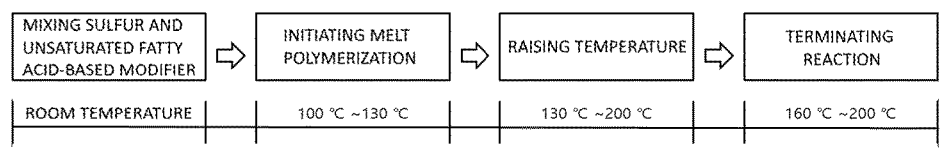
[Fig. 2]
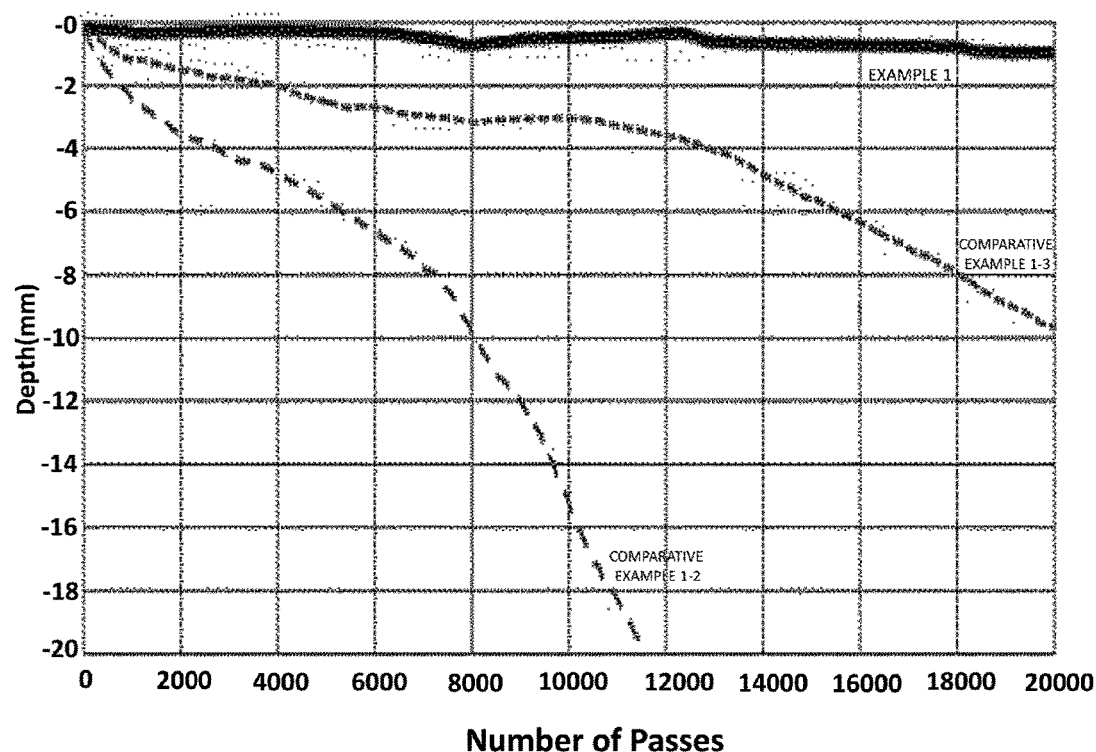

[Fig. 3]
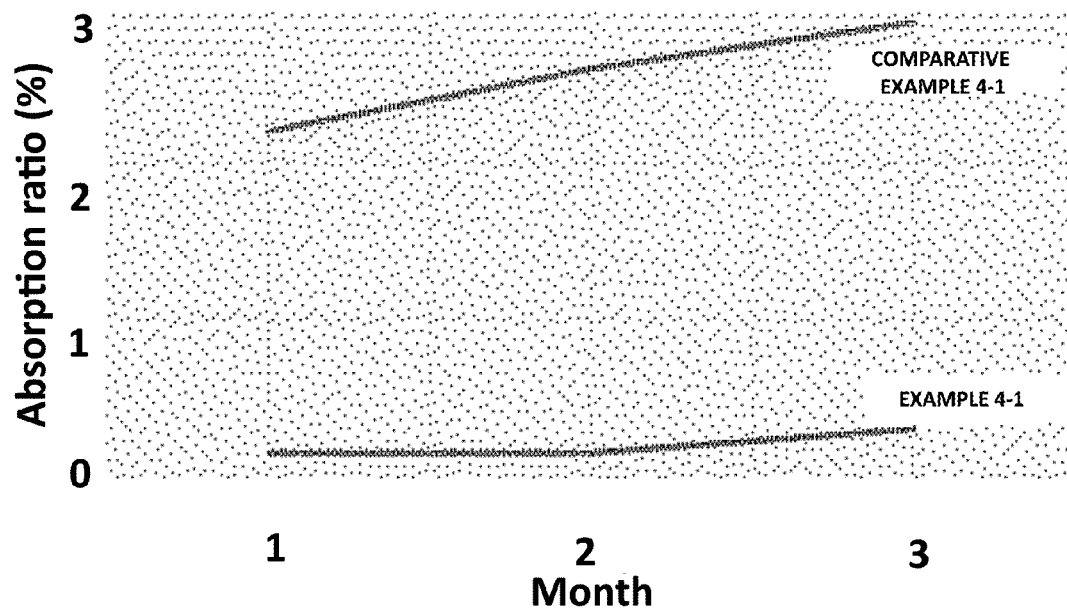
[Fig. 4]
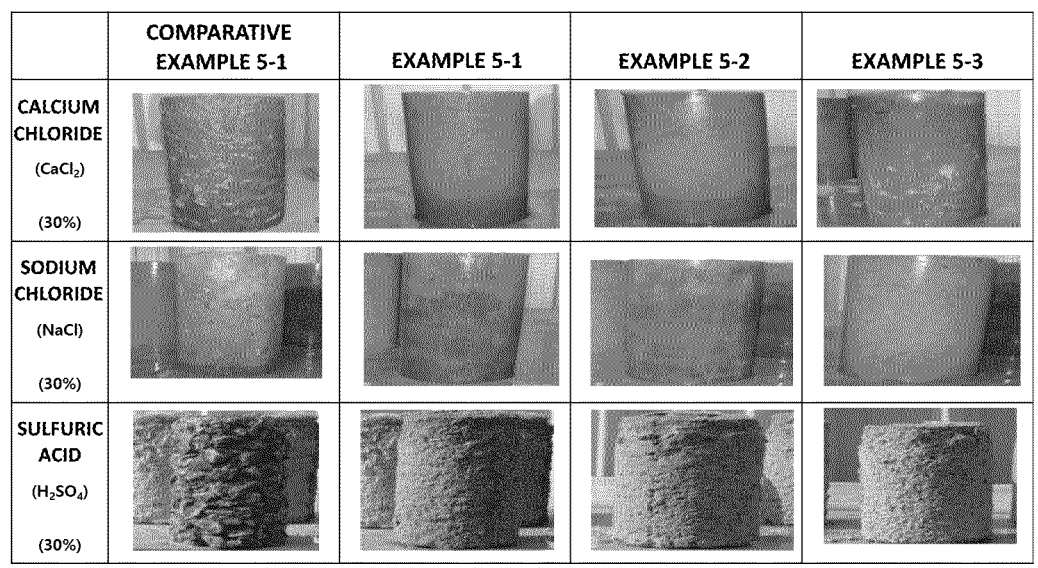

[Fig. 5]
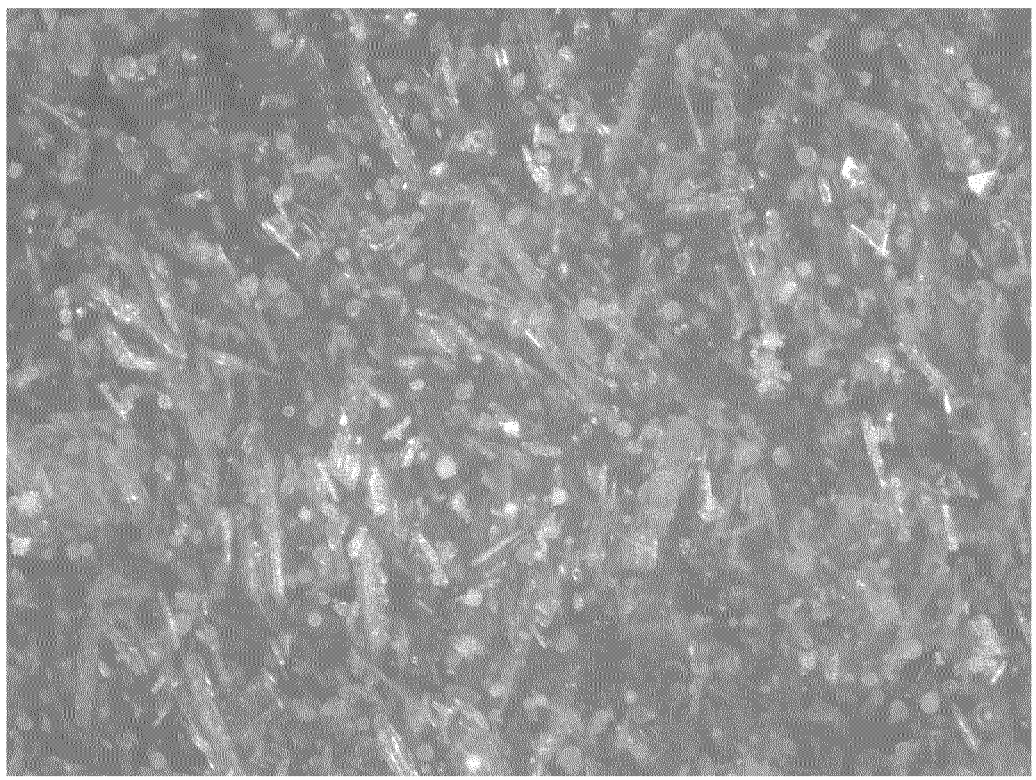

MODIFIED SULFUR AND PRODUCTION METHOD THEREOF

TECHNICAL FIELD

The present specification relates to environmentally-friendly modified sulfur and a production method thereof.

BACKGROUND ART

Sulfur is a substance which has a flash point of 207° C. and a spontaneous ignition temperature of 245° C., exhibits ignitionability, and is easily combusted when the surface thereof is exposed to and comes in contact with air. Sulfur is not only obtained as natural sulfur derived from nature but also commonly generated during the desulfurization process of crude oil or natural gas.

Stable solid-phase sulfur exhibits high strength if the sulfur itself is not defective, whereas solid-phase sulfur, which is formed by cooling and solidifying liquid-phase sulfur, generally is present as a mixture of three types of forms, that is, an orthorhombic crystal system, a monoclinic crystal system, and an amorphous form. In the case of the solidified solid-phase sulfur, the mixing ratio of three types of forms varies depending on cooling conditions, and the solidified sulfur itself is likely to become defective and brittle (have brittleness) over time. Therefore, pure sulfur has a very limited application range.

Although pure sulfur can be applied to various construction and civil engineering materials, the use thereof alone has a limitation due to the above-described characteristics. Specifically, sulfur materials having brittle fracture characteristics are unstable materials similar to typical Portland concrete in which plastic deformation hardly takes place such that all of the force applied to the material is used for destruction, causing instantaneous destruction when a force above yield strength is applied.

In order to solve these disadvantages, various types of a sulfur modifier are being considered. Especially, dicyclopentadiene (DCPD) is known to not only have high economic feasibility due to its low cost but also be effective for improving the brittleness of sulfur.

However, it is known that, since it is difficult to control the polymerization reaction of dicyclopentadiene and sulfur itself, there are a risk of an explosive exothermic reaction and a rapid increase in temperature and viscosity during the reaction.

Especially, when the polymerization reaction proceeds beyond an appropriate extent, it is known that a rubberization phenomenon may occur, and accordingly the reactor used for the polymerization reaction is damaged, which makes the commercial use of a sulfur modifier made of a dicyclopentadiene-based modifier and sulfur very difficult. In addition, dicyclopentadiene and sulfur are inefficient in production and application due to a supercooling phenomenon occurring after the polymerization reaction and have a difficulty in actual application in road construction due to having environmentally hazardous issues and disgusting odors. Additionally, since dicyclopentadiene and sulfur have a difficulty in retaining constant quality due to the influence of an external temperature, there is a difficulty in work instability, such as cracking, sinkage, and the like, after construction.

PRIOR-ART DOCUMENTS

Patent Documents

Korean Laid-Open Patent Publication No. 10-2014-0000160

DISCLOSURE

Technical Problem

The present invention is directed to developing modified sulfur which is produced using an environmentally-friendly material and exhibits high functionality to solve problems of the conventional modified sulfur, such as environmentally hazardous factors, odors, and the like.

Technical Solution

One aspect of the present specification provides modified sulfur including sulfur and a modifier, wherein the modifier is an unsaturated fatty acid-based modifier.

Another aspect of the present specification provides a method of producing modified sulfur which includes: a first step of mixing sulfur and an unsaturated fatty acid-based modifier; a second step of introducing the resulting mixture into a reactor and melting the same by heating at 100° C. or more and 130° C. or less; a third step of raising a temperature of the melted mixture to 130° C. or more and 200° C. or less; and a fourth step of terminating the reaction when a viscosity of the melted mixture reaches 6,000 cP or more and 25,000 cP or less at 160° C.

Still another aspect of the present specification provides a concrete composition including the above-described modified sulfur and aggregate.

Advantageous Effects

The modified sulfur according to an embodiment of the present specification is environmentally-friendly because the modified sulfur is produced while a petroleum-derived modifier is excluded or minimized and replaced with a modifier derived from nature.

In addition, the modified sulfur according to an embodiment of the present specification exhibits high functionality, that is, excellent properties in terms of adhesive strength, chemical resistance, flame retardancy, waterproofness, corrosion resistance, watertightness, flow resistance, equilibrium resistance, and the like.

DESCRIPTION OF DRAWINGS

FIG. 1 is a flow chart illustrating a method of producing modified sulfur according to an embodiment of the present specification.

FIG. 2 is a diagram illustrating results of the wheel tracking test of Example 1, Comparative Example 1-2, and Comparative Example 1-3.

FIG. 3 is a diagram of measuring the moisture absorption rate of Example 4-1 and Comparative Example 4-1.

FIG. 4 shows images comparing the chemical resistances of Examples 5-1 to 5-3 and Comparative Example 5-1.

FIG. 5 is a photographic image (×750) of the microstructure of modified sulfur according to an embodiment of the present specification.

MODES OF THE INVENTION

Advantages and features of the present invention and methods for achieving the same will be apparent by the exemplary embodiments described below in detail with reference to the accompanying drawings. However, the present invention is not limited to the exemplary embodiments described below and may be implemented in various different forms. Rather, the exemplary embodiments have been provided to make the disclosure of the present invention thorough and complete and to fully inform the scope of the present invention to those of ordinary skill in the art to which the present invention pertains, and the present invention is defined only by the scope of the claims. Like reference numerals refer to like elements throughout the specification.

Meanwhile, all terms used herein, including technical or scientific terms, should be interpreted as having the same meaning as commonly understood by one of ordinary skill in the art to which the present invention pertains unless otherwise defined. Therefore, terms such as those defined in the commonly used dictionaries are not to be interpreted in an ideal or overly formal sense unless explicitly defined herein.

Throughout the specification, when a portion "includes" an element, another element may be further included, rather than excluding the presence of the other element, unless otherwise described.

Hereinafter, the present invention will be described in detail.

Modified Sulfur

One aspect of the present invention provides modified sulfur including sulfur and a modifier, wherein the modifier is an unsaturated fatty acid-based modifier.

According to an embodiment of the present invention, the modified sulfur has a viscosity of 4,000 cP or more and 25,000 cP or less at room temperature. Specifically, according to an embodiment of the present specification, the modified sulfur may have a viscosity of 6,000 cP or more and 10,000 cP or less at room temperature.

In the present specification, the sulfur encompasses ordinary sulfur, and examples thereof include natural sulfur, sulfur obtained by desulfurization of petroleum or natural gas, and the like. As the sulfur of the present invention, solid-phase sulfur may be used after being heated to a temperature above the melting point thereof to facilitate a reaction, or liquid-phase sulfur discharged in a related industry such as petrochemicals and the like may be used. In addition, sulfur obtained by simply filtering impurity-containing waste sulfur discharged in a steel mill may be used.

In the present specification, the unsaturated fatty acid-based modifier may mean a compound including at least one carboxyl acid group and at least one carbon-carbon double bond therein.

According to an embodiment of the present specification, the unsaturated fatty acid-based modifier may be a material obtained by using a fatty acid or an unsaturated fatty acid and then recycling the used fatty acid or unsaturated fatty acid or a material derived from nature. Therefore, a case where the unsaturated fatty acid-based modifier is included, as described in one aspect of the present specification, is environmentally-friendly compared to the conventional case where a petroleum-derived modifier is included.

According to one embodiment, the modifier is one or two or more selected from the group consisting of erucic acid, palmitoleic acid, elaidic acid, myristoleic acid, linoleic acid, arachidonic acid, gondoic acid, oleic acid, eicosapentaenoic acid, docosahexaenoic acid (DHA), α-linolenic acid, γ-linolenic acid (GLA), and vegetable oils.

According to one embodiment, the vegetable oil may be selected from the group consisting of oils extracted from natural vegetable oils such as *Chamaecyparis obtusa* oil, lemon oil, rose oil, lavender oil, sunflower seed oil, corn oil, mustard oil, castor oil, olive oil, cottonseed oil, *Macadamia integrifolia* oil, flaxseed oil, pine oil, *Hippophae rhamnoides* oil, *Lunaria biennis* oil, canola oil, and the like.

According to an embodiment of the present specification, the modifier is included in an amount of 10 parts by weight or more and 450 parts by weight or less based on 100 parts by weight of the sulfur. Specifically, the modifier may be included in an amount of 30 parts by weight or more and 300 parts by weight or less based on 100 parts by weight of the sulfur. When the content of the modifier is less than 10 parts by weight based on 100 parts by weight of the sulfur, it may be difficult to maintain a liquid phase after synthesis and expect the functionality of the modified sulfur, and the brittleness of sulfur also remains, which cause a difficulty in use. On the other hand, when the content of the modifier is greater than 450 parts by weight based on 100 parts by weight of the sulfur, although the brittleness of sulfur does not remain, functionality, such as waterproofness, corrosion resistance, adhesion, chemical resistance, and the like, of the modified sulfur may be remarkably degraded.

According to one embodiment, the modified sulfur exhibits spinnability. In the present invention, spinnability may be expressed as the capability of being spun and the like, and the presence or absence of spinnability is determined by an experiment in which a glass rod is immersed in and taken out of a mixture or reaction product in a solution state during the production of modified sulfur, and when a phenomenon in which a portion of the mixture or reaction product in a solution state is continuously spun like a thread while being connected to the glass rod (1 cm or more) is observed, the mixture or reaction product may be defined as having spinnability.

According to one embodiment, the modified sulfur has a network structure or a honeycomb structure. Since the modified sulfur according to an embodiment of the present specification includes an unsaturated fatty acid-based modifier, the double bond in the unsaturated fatty acid-based modifier may form a crosslink by polymerization so as to have a honeycomb structure or a network structure. In this case, functionality, such as adhesive strength, chemical resistance, flame retardancy, corrosion resistance, watertightness, flow resistance, high strength, and the like, of the modified sulfur may be enhanced.

FIG. 5 is a photographic image (×750) of the microstructure of the modified sulfur according to an embodiment of the present specification. Referring to FIG. 5, it can be seen that the modified sulfur according to an embodiment of the present specification has a microstructure, and specifically, the modified sulfur according to an embodiment of the present specification has a fibrous structure.

According to one embodiment, the modified sulfur is amphiphilic. Since the modified sulfur according to an embodiment of the present specification includes an unsaturated fatty acid-based modifier, amphiphilic modified sulfur may be provided.

Rusted and corroded metal surfaces need anti-corrosion treatment, and structures such as buildings and the like need waterproofing treatment for the purpose of preventing leaks and cracking and reinforcing durability. Since the conventional waterproof and anti-corrosion materials have a limitation in repetitive coating formation, workability, pose an environmental risk, and the like and exhibit low durability due to low chemical resistance and low adhesive strength, an improvement in the lifetime of the product is required.

Although rubberized solid-phase modified sulfur with high viscosity has high enough chemical resistance and adhesive strength to be used as an alternative to epoxy fibre-reinforced plastic (FRP), a separate device such as a heated sprayer is required for high-temperature pretreatment for melting the modified sulfur so as to use the modified sulfur in the construction and repair/reinforcement of structures such as concrete structures or tunnel structures.

The modified sulfur according to an embodiment of the present specification may be amphiphilic modified sulfur with hydrophilicity and hydrophobicity. Due to having hydrophobicity, the modified sulfur may be used in a polymer concrete composition for paving and repairing/reinforcing the road just by mixing liquid-phase modified sulfur and aggregate at room temperature without performing preheating and heating processes. In addition, due to having hydrophilicity, the modified sulfur may be used in a common Portland concrete working scheme by adding water, aggregate, a modified sulfur binder, and hydraulic materials (for example, a trace amount of a water-reducing agent, an antifoaming agent, a releasing agent, and the like) and mixing them at room temperature without performing preheating and heating processes.

According to an embodiment of the present specification, the modified sulfur may be in a liquid phase. In this case, high miscibility with materials and high dispersibility are exhibited, a heating process is not separately required in blending with hydraulic materials, and high modification effects may be realized even by using a small amount thereof. However, the modified sulfur may be subjected to various modifications, as necessary, and may be applied in various forms, for example, in a solid phase, a pellet form, a powder form, and the like.

According to one embodiment, the modified sulfur further includes a second modifier different from the unsaturated fatty acid-based modifier.

According to one embodiment, the second modifier may be one or two or more selected from the group consisting of a saturated fatty acid-based modifier, an unsaturated fatty acid-based modifier, an alcohol-based modifier, an ester-based modifier, and a dicyclopentadiene-based modifier.

The second modifier may be added optionally in the synthesis of modified sulfur depending on the area of application.

According to an embodiment of the present specification, the saturated fatty acid-based modifier may be stearic acid, palmitic acid, or the like, but the present invention is not limited thereto.

According to an embodiment of the present specification, the unsaturated fatty acid-based modifier may be oleic acid or the like, but the present invention is not limited thereto.

According to an embodiment of the present specification, the alcohol-based modifier may be glycerol or the like, but the present invention is not limited thereto.

According to an embodiment of the present specification, the ester-based modifier may be a wax ester, dihydrocholesteryl oleate, or the like, but the present invention is not limited thereto.

In the present specification, the dicyclopentadiene-based modifier means a dicyclopentadiene-based modifier containing a cyclopentadiene oligomer. Dicyclopentadiene (DCPD), which is a dimer of cyclopentadiene (CPD), may be produced during the pyrolysis of naphtha, and any commercially available product may be used as long as it includes dicyclopentadiene.

Specifically, the dicyclopentadiene-based modifier may be: 1) dicyclopentadiene (DCPD); 2) a mixture of dicyclopentadiene and at least one selected from the group consisting of cyclopentadiene (CPD), DCPD derivatives, and CPD derivatives (methylcyclopentadiene (MCP), methyldicyclopentadiene (MDCP)); and 3) a mixture of 1) or 2) and at least one selected from the group consisting of olefin compounds such as dipentene, vinyl toluene, styrene monomers, dicyclopentene, and the like.

According to an embodiment of the present specification, the second modifier may be included in an amount of 0.01 parts by weight or more and 300 parts by weight or less based on 100 parts by weight of the sulfur. The content range of the second modifier may be widely adjusted depending on the area of application of modified sulfur, specifically, depending on properties such as adhesion, hydrophobicity, waterproofness, corrosion resistance, and the like.

Specifically, when the dicyclopentadiene-based modifier is used as the second modifier, the dicyclopentadiene-based modifier is included in an amount of 0.01 parts by weight or more and 5 parts by weight or less based on 100 parts by weight of the sulfur. In addition, when the saturated fatty acid-based modifier, unsaturated fatty acid-based modifier, alcohol-based modifier, or ester-based modifier is used as the second modifier, the second modifier is included in an amount of 10 parts by weight or more and 300 parts by weight or less based on 100 parts by weight of the sulfur.

In the case of using the dicyclopentadiene-based modifier as the second modifier, when the dicyclopentadiene-based modifier is included in an amount of less than 0.01 parts by weight based on 100 parts by weight of the sulfur, it is difficult to provide modified sulfur with desired functionality, and when the dicyclopentadiene-based modifier is included in an amount of greater than 5 parts by weight based on 100 parts by weight of the sulfur, it is possible to provide modified sulfur with desired functionality, but it is difficult to use the modified sulfur in the field due to environmental risk and disgusting odors. More specifically, in the case of using dicyclopentadiene (DCPD) as the second modifier, when the DCPD is included in an amount of greater than 100 parts by weight based on 100 parts by weight of the sulfur, modified sulfur is not easily synthesized due to the occurrence of a spalling failure of DCPD during the synthesis reaction, the modified sulfur is in a solid phase after the cooling despite having a viscosity of 10,000 cP or more after the synthesis, thereby making it difficult to use without applying heat and making its application in the field almost impossible due to disgusting odors.

According to an embodiment of the present specification, the modified sulfur may further include one or two or more selected from the group consisting of an initiator, a surfactant, a coupling agent, a catalyst, an additive, a crosslinking agent, and a dispersant.

Specifically, the initiator, surfactant, coupling agent, catalyst, additive, crosslinking agent, and dispersant are not particularly limited as long as they do not interfere with the polymerization reaction of the modified sulfur of the present invention and are materials commonly classified under the above names. The initiator, surfactant, coupling agent, catalyst, additive, crosslinking agent, and dispersant may serve to enhance the dispersion of the modified sulfur, form a hydrophilic or hydrophobic reactive group in the modified sulfur, and inhibit or promote crosslinking in the modified sulfur produced by the polymerization reaction.

According to an embodiment of the present specification, the initiator may be one or two or more selected from the group consisting of sulfur, modified sulfur, asphalt, sulfides, polysulfides, and hydrocarbon compounds. The initiator may be added simultaneously with the modifier or separately during the reaction. When the initiator is sulfur, the sulfur may be added during the reaction and applied as the initiator.

As the initiator, the sulfur may be elemental sulfur, crystalline sulfur, amorphous sulfur, colloidal sulfur, or a mixture thereof. In addition, the sulfur may be any one selected from the group consisting of α-sulfur (orthorhombic sulfur), β-sulfur (monoclinic sulfur), γ-sulfur, and a combination thereof. The asphalt refers to straight asphalt or modified asphalt, and the sulfide may be a sulfur-containing compound, such as carbon disulfide or the like, but the present invention is not limited thereto. The polysulfide may be a polysulfide modified epoxy resin or the like, but the present invention is not limited thereto. The hydrocarbon compounds refer to compounds consisting of carbon and hydrogen and encompass straight-chain, branched-chain, cyclic, and aromatic hydrocarbon compounds. The initiator may be pre-polymerized modified sulfur and is not limited to modified sulfur produced by a specific method.

According to an embodiment of the present specification, the initiator may be one or two or more selected from the group consisting of trans-cinnamaldehyde, benzyl acetate, diethylaniline, nitroethane, formaldehyde hydrate, benzyl acetate, dodecylbenzenesulfonic acid, cetyl trimethyl ammonium bromide (CTMAB), methylmorpholine and morpholine, and dimethylaniline.

The above-exemplified initiators may be used alone, in combination of two or more thereof, or together with an initiator not exemplified above.

The initiator may serve to promote or adjust the polymerization of the unsaturated fatty acid-based modifier and the sulfur.

According to an embodiment of the present specification, the initiator may be included in an amount of 0.01 parts by weight or more and 2 parts by weight or less based on 100 parts by weight of the sulfur.

According to an embodiment of the present specification, the initiator may adjust the characteristics of produced modified sulfur by varying the specific type, addition amount, and addition point of an applied initiator, reaction conditions, and the like.

In the present specification, the surfactant may be one or two or more selected from the group consisting of an anionic surfactant, a cationic surfactant, a nonionic surfactant, and an amphoteric surfactant.

The anionic surfactant is a sulfate-based anionic surfactant, a sulfonate-based anionic surfactant, or other anionic surfactants. Examples of the sulfate-based anionic surfactant include: alkyl sulfates, alkyl ester sulfates, alkyl ether sulfates, alkyl ethoxy ether sulfates; sulfated alkanolamides; glyceride sulfate; and the like, but the present invention is not limited thereto. Examples of the sulfonate-based anionic surfactant include: dodecylbenzene sulfonate, including alkylbenzene sulfonate (ABS) and linear alkylbenzene sulfonate (LAS); hydrotropes and short tail alkylbenzene sulfonate; alpha-olefin sulfonates; lignosulfonates; sulfocarboxylic compounds, including sodium lauryl sulfoacetate; and the like, but the present invention is not limited thereto. Examples of other anionic surfactants include: organophosphorous surfactants; alkylamino acids including lauryl sarcosinate; sarcosine; and the like, but the present invention is not limited thereto.

The cationic surfactant is a linear alkylamine including a fatty amine, linear alkyl ammonium including quaternary alkylammonium, a linear diamine, n-dodecylpyridinium chloride, imidazole, a morpholine compound, or the like, but the present invention is not limited thereto.

The nonionic surfactant is an ethoxylated alcohol, alkylphenol, fatty acid ester, or nitrogenated nonionic surfactant. Examples of the ethoxylated alcohol and alkylphenol nonionic surfactants include linear ethoxylated alcohols, ethoxylated alkylphenols, ethoxylated thiols, nonylphenols, octylphenols, and the like, but the present invention is not limited thereto. Examples of the fatty acid ester nonionic surfactant include polyethoxy esters, glycerol esters, hexitol, cyclic anhydrohexitol esters, and the like, but the present invention is not limited thereto. Examples of the nitrogenated nonionic surfactant include ethoxylated amines, imidazole (cyclic alkyl diamine), ethoxylated alkyl amides, tertiary amine oxides, and the like, but the present invention is not limited thereto.

The amphoteric surfactant is aminopropionic acid, iminopropionic acid, a quaternary compound, or the like. Examples of the quaternary compound include sulfobetaine-based surfactants and the like, but the present invention is not limited thereto.

In the present specification, when the surfactant is selected and applied depending on the area of application of the modified sulfur, specific functionality required depending on the area of application in the production of the modified sulfur may be enhanced.

In the present specification, the coupling agent may be one or two or more selected from the group consisting of a silane-based coupling agent, a titanate-based coupling agent, and a chromium-based coupling agent, and surfactants used in the art may be used.

The silane-based coupling agent may be any one selected from the group consisting of a sulfide-based silane compound, a mercapto-based silane compound, a vinyl-based silane compound, an amino-based silane compound, a glycidoxy-based silane compound, a nitro-based silane compound, a chloro-based silane compound, a methacrylic-based silane compound, and a combination thereof, but the present invention is not limited thereto.

The titanate-based coupling agent may be any one selected from the group consisting of isopropyl triisostearoyl titanate, isopropyl tridodecylbenzenesulfonyl titanate, isopropyl tri(dioctylpyrophosphate) titanate, tetraisopropyl di(tridecylphosphite) titanate, tetraisopropyl di(dioctylphosphite) titanate, tetraoctyloxytitanium(ditridecylphosphite), and a combination thereof, but the present invention is not limited thereto.

In the present specification, when the coupling agent is used, the interfacial adhesive strength of the modified sulfur may be enhanced, and when the modified sulfur is used in combination with heterogeneous materials, adhesion with the heterogeneous materials may be enhanced, which is advantageous for forming a composite material.

In the present specification, the additive may be an inorganic or resin additive and may specifically be one or two or more selected from the group consisting of silica sand, diatomite, wollastonite, clay, chopped glass fiber, a dye, a pigment, aluminum sulfate, water glass, $Ca(OH)_2$, zinc oxide, naphthalene, $Mg(OH)_2$, $CaCl_2$, $Al(OH)_3$, borax, $CaSO_4 \cdot 2H_2O$, $Fe_2O_3$, a zeolite, carbon black, talc, a carbon fiber, clay, a whisker, $Na_2SO_3$, $MgSO_4 \cdot 7H_2O$, fly ash, an acrylic emulsion, epoxy, latex, a carbon fiber or sheet, a steel fiber, a liquid mineral, titanium dioxide, a fibrous filler, a fibrous particle, a flaky particle, crushed recycling waste, and a combination thereof.

According to an embodiment of the present specification, the additive may be included in an amount of 0.1 parts by weight or more and 30 parts by weight or less based on 100 parts by weight of the sulfur.

The crosslinking agent may be a sulfur-based crosslinking agent, an organic peroxide, a resin crosslinking agent, or a metal oxide such as magnesium oxide or the like. The sulfur-based crosslinking agent may be an inorganic crosslinking agent such as powder sulfur (S), insoluble sulfur (S), precipitated sulfur (S), colloidal sulfur, or the like; or an organic crosslinking agent such as tetramethylthiuram disulfide (TMTD), tetraethylthiuram disulfide (TETD), dithiodimorpholine, or the like, but the present invention is not limited thereto. Specifically, the sulfur-based crosslinking agent may be elemental sulfur or a vulcanizing agent that forms sulfur (e.g., amine disulfide), polymeric sulfur, or the like, but the present invention is not limited thereto. The organic peroxide may be any one selected from the group consisting of benzoyl peroxide, dicumyl peroxide, di-t-butyl peroxide, t-butyl cumyl peroxide, methyl ethyl ketone peroxide, cumene hydroperoxide, 2,5-dimethyl-2,5-di(t-butylperoxy)hexane, 2,5-dimethyl-2,5-di(benzoylperoxy)hexane, 2,5-dimethyl-2,5-di(t-butylperoxy)hexane, 1,3-bis(t-butylperoxypropyl)benzene, di-t-butylperoxy-diisopropylbenzene, t-butyl peroxy benzene, 2,4-dichlorobenzoyl peroxide, 1,1-dibutylperoxy-3,3,5-trimethylsiloxane, n-butyl-4,4-di-t-butylperoxyvalerate, and a combination thereof, but the present invention is not limited thereto.

The dispersant may be used to enhance miscibility between the modified sulfur and the surfactant, between the modified sulfur and the coupling agent, or between the modified sulfur and a reinforcing material. As the dispersant, any dispersant may be used as long as it may enhance the degree of dispersion when modified sulfur is mixed with a surfactant, a coupling agent, a reinforcing material, or the like. In addition, the surfactant may also act as the dispersant to the extent that it plays a role in enhancing the degree of dispersion during the mixing.

As the dispersant, any one polymer dispersant selected from the group consisting of polyvinylpyrrolidone, polyethyleneimine, polyacrylic acid, carboxymethyl cellulose, polyacrylamide, polyvinyl alcohol, polyethylene oxide, starch, gelatin, and a combination thereof may be used, but the present invention is not limited thereto.

One or two or more selected from the group consisting of the initiator, surfactant, coupling agent, catalyst, additive, crosslinking agent, and dispersant may be mixed with modified sulfur in a solvent.

As the solvent, any conventional solvent may be used without limitation as long as it helps to mix the modified sulfur with the initiator, surfactant, coupling agent, catalyst, additive, crosslinking agent, and/or dispersant and does not interfere with the polymerization of the modified sulfur.

The solvent may be one or two or more selected from the group consisting of water, an aromatic hydrocarbon-based solvent, an aliphatic hydrocarbon-based solvent, an ether-based solvent, an alcohol-based solvent, a polyol solvent, an amide-based solvent, an acetate-based solvent, a non-aqueous inorganic solvent, an amine-based solvent, an ester-based solvent, a ketone-based solvent, and a sulfone-based solvent.

The aliphatic or aromatic hydrocarbon-based solvent may be any one selected from the group consisting of toluene, xylene, Aromasol, chlorobenzene, hexane, heptane, octane, dodecane, cyclohexane, decane, tetradecane, hexadecane, octadecane, octadecene, nitrobenzene, o-nitrotoluene, anisole, mesitylene, and a combination thereof, but the present invention is not limited thereto.

The ether-based solvent may be any one selected from the group consisting of diethyl ether, dipropyl ether, dibutyl ether, dioxane, tetrahydrofuran, diisobutyl ether, isopropyl ether, octyl ether, tri(ethylene glycol) dimethyl ether, and a combination thereof, but the present invention is not limited thereto.

The alcohol-based solvent may be any one selected from the group consisting of methanol, ethanol, 1-propanol, 2-propanol, 1-butanol, 2-butanol, isobutanol, hexanol, isopropyl alcohol, ethoxy ethanol, ethyl lactate, octanol, isopropyl alcohol, ethylene glycol monomethyl ether, benzyl alcohol, 4-hydroxy-3-methoxy benzaldehyde, isodeconol, butyl carbitol, terpineol, alpha-terpineol, beta-terpineol, cineole, and a combination thereof, but the present invention is not limited thereto.

The polyol solvent may be any one selected from the group consisting of glycerol, glycol, ethylene glycol, diethylene glycol, triethylene glycol, tetraethylene glycol, propylene glycol, dipropylene glycol, butanediol, hexylene glycol, 1,2-pentanediol, 1,2-hexanediol, glycerin, polyethylene glycol, polypropylene glycol, ethylene glycol monomethyl ether (methyl cellosolve), ethylene glycol monoethyl ether (ethyl cellosolve), ethylene glycol monobutyl ether (butyl cellosolve), diethylene glycol monoethyl ether, diethylene glycol monobutyl ether, and a combination thereof, but the present invention is not limited thereto. [0128] The amide-based solvent may be any one selected from the group consisting of N-methyl-2-pyrrolidone (NMP), 2-pyrrolidone, N,N-dimethylacetamide, and a combination thereof, but the present invention is not limited thereto.

The amine-based solvent may be any one selected from the group consisting of primary amines such as propylamine, n-butylamine, hexylamine, octylamine, and the like, secondary amines such as diisopropylamine, di(n-butyl) amine, and the like, tertiary amines such as trioctylamine, tri-n-butylamine, and the like, alkyl amines such as ethylamine, propylamine, butylamine, hexylamine, octylamine, trioctylamine, and the like, cyclic amines, aromatic amines, and a combination thereof, but the present invention is not limited thereto.

The ester-based solvent may be any one selected from the group consisting of PEGMEA, ethyl acetate, n-butyl acetate, γ-butyrolactone, 2,2,4-trimethylpentanediol-1,3-monoisobutyrate, butyl carbitol acetate, butyl oxalate, dibutyl phthalate, dibutyl benzoate, butyl cellosolve acetate, ethylene glycol diacetate, ethylene glycol diacetate, and a combination thereof, but the present invention is not limited thereto.

The ketone-based solvent may be any one selected from the group consisting of acetone, methyl ethyl ketone, methyl isobutyl ketone, 1-methyl-2-pyrrolidinone, cyclohexanone, and a combination thereof, but the present invention is not limited thereto.

The amide-based solvent may be any one selected from the group consisting of N-methyl-2-pyrrolidone (NMP), 2-pyrrolidone, N,N-dimethylacetamide, and a combination thereof, but the present invention is not limited thereto.

The sulfone-based solvent may be any one selected from the group consisting of diethyl sulfone, tetramethylene sulfone, and a combination thereof, but the present invention is not limited thereto.

The acetate-based solvent may be any one selected from the group consisting of ethyl acetate, butyl acetate, propylene glycol methyl ether acetate, and a combination thereof.

The non-aqueous inorganic solvent may be carbon disulfide, liquid ammonia, or the like, but the present invention is not limited thereto.

According to an embodiment of the present specification, the modifier is a binder produced by melt polymerization of sulfur and an environmentally-friendly modifier and generally is in a liquid or gel phase at room temperature. In addition, a modifier in a solid phase (powder or pellet form), which is obtained by maximizing polymerization in the melt polymerization depending on an intended purpose, may include any one selected from the group consisting of ethanol, methanol, methyl ethyl ketone (MEK), toluene, m-xylene, p-xylene, and the like as a diluent to be mixed when used as a material for a waterproofing agent and an anti-corrosion agent. The intended purpose may refer to increasing hydrophobicity, waterproofness, corrosion resistance, chemical resistance, adhesion, high strength, and the like, as necessary.

Method of Producing Modified Sulfur

Another aspect of the present invention provides a method of producing modified sulfur which includes: a first step of mixing sulfur and an unsaturated fatty acid-based modifier; a second step of introducing the resulting mixture into a reactor and melting the same by heating at 100° C. or more and 130° C. or less; a third step of raising a temperature of the melted mixture to 130° C. or more and 200° C. or less; and a fourth step of terminating the reaction when a viscosity of the melted mixture reaches 6,000 cP or more and 25,000 cP or less at 160° C.

According to an embodiment of the present specification, the modified sulfur produced by the method may be applied in the same manner as in the above-described description of modified sulfur unless contradicted by the following description.

According to an embodiment of the present specification, the first step of mixing sulfur and an unsaturated fatty acid-based modifier is carried out so that the unsaturated fatty acid-based modifier is included in an amount of 10 parts by weight or more and 450 parts by weight or less based on 100 parts by weight of the sulfur.

According to one embodiment, in the first step, a second modifier may be further included in the above-described content range.

According to one embodiment, one or two or more selected from the group consisting of the initiator, surfactant, coupling agent, catalyst, additive, crosslinking agent, and dispersant may be further included in the above-described content range.

According to one embodiment, the first step may be carried out at room temperature (about 15° C. to 25° C.) or above.

According to an embodiment of the present specification, a mixture of sulfur and an unsaturated fatty acid-based modifier, which has been prepared in the first step, has a viscosity of 0 cP at room temperature before being heated.

According to an embodiment of the present specification, in the second step, the mixture may be melted by heating at 100° C. or more and 130° C. or less. Specifically, in the second step, the mixture may be melted by heating at an internal temperature of about 120° C., and polymerization is initiated.

Specifically, in the second step, the mixture is introduced into a polymerization reactor, a temperature of the polymerization reactor is set to about 120° C. using a temperature controller, the introduction of the mixture into the polymerization reactor is terminated, and melt polymerization may be initiated. In addition, at the polymerization reactor temperature of about 120° C., melt polymerization may proceed while the blade of the reactor is stopped until sulfur and other mixing materials completely become a liquid and then rotated when the mixture is converted into a liquid.

According to an embodiment of the present specification, after the mixture becomes a liquid in the second step, the third step of raising a temperature of the liquid-phase mixture may be carried out.

According to an embodiment of the present specification, the third step of raising a temperature of the melted mixture may be carried out by continuously raising a temperature of the melted mixture to 130° C. or more and 200° C. or less. Specifically, the third step of raising a temperature of the melted mixture may be carried out by continuously raising a temperature of the melted mixture to 130° C. or more and 180° C. or less. More specifically, in the third step, a temperature may be raised by adjusting the temperature controller of the polymerization reactor so that a temperature is set to about 135° C. when the melted mixture produced in the second step is converted into a liquid.

According to one embodiment, the third step of raising a temperature of the melted mixture may be carried out so that a temperature outside the reactor and a temperature of the melted mixture differ by 20° C. or less. Specifically, a temperature of the polymerization reactor may be gradually raised by 2° C. to 3° C. to about 135° C. so that a temperature variance inside and outside the reactor is as small as possible (about 5° C. or less). When the temperature elevation rate is high, an exothermic reaction of sulfur and a modifier occurs, and thus the temperature inside the reactor is rapidly raised, causing a difficulty in temperature control and the occurrence of carbonization.

According to an embodiment of the present specification, when a temperature of the melted mixture is 160° C. or more, the state and viscosity of the melted mixture are measured three times or more per hour, and the fourth step of terminating the reaction may be carried out depending on the area of application. Specifically, when the reaction is terminated when a viscosity reaches 6,000 cP or more and 15,000 cP or less at 160° C., the modified sulfur thus produced may be used for room-temperature asphalt or modified sulfur polymer concrete, and when the reaction is terminated when a viscosity reaches 6,000 cP or more and 25,000 cP or less at 160° C., the modified sulfur thus produced may be used for waterproofing paint or anti-corrosion paint.

According to an embodiment of the present specification, the melted mixture has a viscosity of 4,000 cP or more and 25,000 cP or less at 135° C.

When the reaction time of the third step is prolonged, rubberized modified sulfur with high viscosity may be provided. In this case, the modified sulfur may be used for a waterproofing material and an anti-corrosion material by using a diluent. In addition, the high-viscosity modified sulfur produced in a solid phase or in a powder form may provide properties, such as waterproofness, corrosion resistance, high adhesion, chemical resistance, and the like, when added in the construction of roads and concrete structures and may be applied in various applications such as a fast-setting repairing agent, a fast-setting water-stopping agent, a waterproofing sheet, antimicrobial silicone, paint, a waterproofer and tile adhesive, and the like due to its high viscosity.

According to an embodiment of the present specification, the fourth step of terminating the reaction when a viscosity of the melted mixture, whose temperature has been raised in the third step, reaches 6,000 cP or more and 25,000 cP or less at 160° C. may be carried out. That is, according to an embodiment of the present invention, the time point where a viscosity of the melted mixture, whose temperature has been raised in the third step, reaches 6,000 cP or more and 25,000 cP or less at 160° C. may be referred to as the end point of the reaction.

According to an embodiment of the present specification, when the reaction is terminated when a viscosity of the melted mixture reaches 6,000 cP or more and 25,000 cP or less at 160° C., the modified sulfur thus produced may exhibit spinnability or have a network structure or a honeycomb structure.

Specifically, the end point of the reaction may be determined as a time point where a microstructure such as a fibrous or flaky structure caused by increased adhesion of the melted mixture is observed (determined by a phenomenon in which, when a small rod is immersed in and taken out of a collected sample, the sample is continuously spun like a thread (3 cm or more) and a phenomenon in which, when the fingers of a disposable silicone glove to which the sample has been applied are detached from one another, the sample is finely stretched into several strands like a thread (1 cm or more)).

In addition, the end point of the reaction may be between a time point where spinnability is exhibited and a time point where rubberization proceeds before carbonization occurs, and the reaction may also be terminated when the modified sulfur thus produced has a microstructure such as a fibrous structure, a honeycomb structure, or a network structure or exhibits spinnability.

According to an embodiment of the present specification, when the reaction is terminated in the fourth step of terminating the reaction when a viscosity of the melted mixture reaches 6,000 cP or more and 25,000 cP or less at 160° C., the temperature inside the reactor may be raised up to about 160° C. to about 200° C.

The reaction product of the fourth step of terminating the reaction may have a viscosity of 5,000 cP to 2,000,000 cP at about 160° C. to about 200° C.

According to an embodiment of the present specification, after the third step and before the fourth step, an aging step is further included. The aging step is carried out by aging the melted mixture at 40° C. or more. When the aging step is further included, the reaction of the melted mixture whose temperature has been raised in the third step may be terminated just before the reaction product exhibits spinnability, and a viscosity of the modified sulfur may be adjusted depending on the area of application.

Specifically, the aging step may be carried out at 40° C. or more and 120° C. or less. More specifically, the aging step may be carried out at about 40° C. to about 120° C. or less. In the aging step, a viscosity of the modified sulfur may be adjusted depending on the area of application.

According to an embodiment of the present specification, the method of producing modified sulfur, that is, the first to fourth steps, may proceed for about 6 hours to about 18 hours, but the process time may vary depending on the amount of the mixture and the structure or material of the polymerization reactor.

In the method of producing modified sulfur, the mixture of sulfur and a modifier is gradually subjected to polymerization while undergoing the second step (polymerization beginning step), and the melted mixture may undergo a color change in the order of yellow, light brown, dark brown, and opaque black in the third step of raising a temperature. An initiator may be added between the time points where the color of the mixture is changed, and another initiator may also be added just before the end of the reaction.

According to an embodiment of the present specification, the mixture produced in the first step, the polymerization temperature and time, and the end point of the reaction may be adjusted depending on the area of application of the modified sulfur so as to adjust a spinning shape and/or a viscosity.

In addition, according to an embodiment of the present specification, the addition point, type, and addition amount of the initiator may be adjusted depending on the area of application of the modified sulfur so as to adjust properties of the modified sulfur.

Concrete Composition

Still another aspect of the present specification provides a concrete composition including the above-described modified sulfur and aggregate.

According to an embodiment of the present specification, the modified sulfur included in the concrete composition may be applied in the same manner as in the above-described description of modified sulfur unless contradicted by the following description.

Since the concrete composition according to an embodiment of the present specification includes the modified sulfur, fluidity is enhanced, which is advantageous for mixing with aggregate in a short time. In addition, since the modified sulfur has a honeycomb structure or a network structure, adhesive strength, waterproofness, elasticity, and/or strength may be enhanced. Furthermore, the modified sulfur according to an embodiment of the present specification solves the problems, such as brittleness and odors, of sulfur and is environmentally-friendly.

In the present specification, the aggregate may be any one selected from the group consisting of recycling industrial waste, steel sand, crushed stone, fly ash, sea sand, quartz sand, gravel, silica, quartz powder, lightweight aggregate, clay minerals, glass powder, and a combination thereof.

The recycling industrial waste refers, for example, to waste lime powder sludge in which lime powder generated when aggregate is pulverized is precipitated with a sodium acrylate copolymer flocculant and which is waste having a difficulty in landfilling because it is treated like waste. However, any industrial waste may be applied as the recycling industrial waste as long as it can be used as the aggregate, and the present invention is not limited to the waste lime powder sludge.

When fine aggregate having a particle diameter of 1 to 10 mm is used as the aggregate, the aggregate may be applied to mortar, and when the fine aggregate and coarse aggregate having a particle diameter of 10 to 18 mm are used together as the aggregate, the aggregate may be applied to concrete.

According to an embodiment of the present specification, based on 100 parts by weight of the concrete composition, the modified sulfur may be included in an amount of 1 part by weight or more and 80 parts by weight or less, and the aggregate may be included in an amount of 70 parts by weight or more and 95 parts by weight or less.

According to an embodiment of the present specification, the concrete composition may be a polymer concrete composition, that is, a resin concrete composition.

According to an embodiment of the present specification, the concrete composition may be applied alone or in combination in the field of latex-modified concrete (LMC) or ultra-rapid hardening cement.

According to an embodiment of the present specification, the concrete composition may be a hydraulic polymer concrete composition.

According to an embodiment of the present specification, the hydraulic polymer concrete composition is capable of being dissolved in water at room temperature, that is, has hydrophilicity. Therefore, the concrete composition may be used after being dissolved in water and then melt-mixed with a water-reducing agent, a releasing agent, an antifoaming agent, and other modifiers or may be used after being melted first and melt-mixed with a water-reducing agent, a releasing agent, an antifoaming agent, and other modifiers.

According to an embodiment of the present specification, the concrete composition may further include a binder. As the binder, a resin, for example, latex, lacquer, epoxy, and methyl methacrylate (MMA), may be used.

Since the concrete composition according to an embodiment of the present specification is thermoplastic like the conventional asphalt, uniform mixing is possible during the melt mixing process.

According to an embodiment of the present specification, the concrete composition may further include a filler.

According to an embodiment of the present specification, the filler may be included in an amount of 1 part by weight or more and 60 parts by weight or less based on 100 parts by weight of the concrete composition.

In the present specification, the filler may be one or two or more selected from the group consisting of lime powder, Portland cement, slaked lime, fly ash, recovered dust, steelmaking dust, a reinforcing material, and crushed waste aggregate and waste powder.

The crushed waste aggregate and waste powder may refer to waste asphalt concrete (ASCON), waste concrete, waste tires, steelmaking slag, waste plastic, waste glass, waste sand sludge, waste lime powder, waste glass powder, or the like.

According to an embodiment of the present specification, the concrete composition may further include a hardening agent.

According to an embodiment of the present specification, the hardening agent may be a commonly used hardening agent, for example, one or a mixture of two or more selected from MgO, cement, and the like, but the present invention is not limited thereto. In addition, light MgO and heavy MgO may be used as the hardening agent depending on the area of application. Furthermore, an amount of the hardening agent may be adjusted to adjust a hardening time and an increase and decrease in strength.

In addition, in the present specification, a composition including the modified sulfur and the hardening agent may be provided, and the composition including the modified sulfur and the hardening agent may be used as a fast-setting repairing agent and a fast-setting adhesive and for realizing waterproofness, corrosion resistance, and the like.

According to an embodiment of the present specification, when the hardening agent is cement, the hardening agent is included in an amount of 10 parts by weight or more and 70 parts by weight or less based on 100 parts by weight of the aggregate.

According to an embodiment of the present specification, when the hardening agent is MgO, the hardening agent is included in an amount of 1 part by weight or more and 40 parts by weight or less based on 100 parts by weight of the aggregate.

When the hardening agent is cement, the cement may be used to pave a road in the field at room temperature using a ribbon mixer or a common ready-mixed concrete mixer without the addition of water. Specifically, since the modified sulfur according to an embodiment of the present specification has a honeycomb structure or a network structure, the modified sulfur may contain moisture by itself using a thixotropic phenomenon. Therefore, when the moisture-containing modified sulfur according to an embodiment of the present specification is utilized, a road may be constructed by a common concrete construction method without additional water supply, and the hardening agent may be adjusted to reduce a curing time of the modified sulfur polymer concrete (1 day to 7 days).

The concrete composition according to an embodiment of the present specification may be applied in various civil engineering and construction materials, road pavement, repair and reinforcement, emergency repair, and the like.

According to an embodiment of the present specification, the method of paving a road at room temperature using the concrete composition (asphalt, asphalt concrete) may be applied in the environmentally-friendly road pavement construction performed using only a mixer and a roller without heating equipment regardless of season anywhere, excluding hot ASCON pavement construction and road pavement construction with a heating scheme. In addition, since the concrete composition including the modified sulfur exhibits high adhesion, an initial oil coating operation is unnecessary in asphalt pavement construction, and thus it is possible to omit the prime coating (tack coating) operation.

According to an embodiment of the present specification, the instant construction method using the concrete composition in the field at room temperature compensates for disadvantages of the conventional asphalt or concrete such that high adhesion, chemical resistance, waterproofness, corrosion resistance, high elasticity, high abrasion resistance, and the like may be enhanced, and environmentally-friendly and economic effects such as environmental friendliness, low costs, high quality, and a reduction of a construction period, which are characteristics of semi-rigid asphalt, may be obtained.

In addition, there are great environmental benefits such as a reduction in air pollution and landfill and great economic benefits such as fast construction and low costs by reprocessing waste through the recycling of industrial and household waste of landfills and incineration plants to produce the modified sulfur, develop road pavement materials and repairing and reinforcing materials, and construct various modified sulfur polymer concrete structures.

The concrete composition including the liquid-phase modified sulfur according to an embodiment of the present specification replaces the conventional hot asphalt so as to allow the room-temperature construction of modified sulfur polymer concrete (semi-rigid asphalt), that is, simple road construction and repair/reinforcement work using only a ready-mixed concrete mixer and a roller without heating equipment by mixing with a modified sulfur binder in the field.

In addition, since the concrete composition according to an embodiment of the present specification exhibits excellent durability due to less deformation even in hot weather and allows concrete construction without water supply, the concrete composition may be suitable for paving a road in desert areas, mountainous areas, Africa, the Middle East, Southeast Asia, and the like.

Additionally, the conventional asphalt construction does not easily proceed in cold winter because the properties of asphalt are highly likely to be changed by a difference in ambient temperature, whereas the modified sulfur according to an embodiment of the present specification may allow the construction and repair/reinforcement of a road even in sub-zero weather (about −5° C.) due to characteristics of sulfur, such as heat generation and strong resistance to low-temperature cracking.

In particular, road construction may be made only with common aggregate and the modified sulfur, so it is most suitable for island areas such as the Philippines, Indonesia, Cuba, and the Caribbean, where there are many islands, and there is no need for asphalt batch plants. In addition, there are great environmental benefits and economic benefits by reprocessing waste through the recycling of industrial and household waste in island areas.

Furthermore, in the case of tunnel construction, when construction is made while applying heat, there are economic benefits such as a low dropout rate (rebound rate) caused by strong adhesive strength and waterproofness and a reduction of the construction period caused by omitting tarpaulin work.

In addition, since the modified sulfur according to an embodiment of the present specification continues to be hardened in water, the modified sulfur is very effective for sinkhole repair work, facilitates emergency repair and emergency road establishment by adjusting a hardening time during construction, and allows a road to be opened in a short time, so there is a wide range of economic effects.

Additionally, it is possible to use sand or aggregate containing salinity (including marine waste) due to strong salt resistance and to make the construction of a temporary road only with common soil or sand for paving a temporary road due to strong adhesive strength and high strength.

The modified sulfur according to an embodiment of the present specification may be applied in emergency road repair by adjusting a hardening time and may be applied in the repair and reinforcement of an old asphalt road, wherein the existing old asphalt may be recycled by scrapping only the upper portion thereof (5 cm) using a road crusher, crushing the scrapped waste ASCON or waste aggregate in the field (to 13 mm aggregate level), mixing the crushed waste ASCON or waste aggregate with the modified sulfur of the present invention at room temperature, depositing the resulting mixture on the road whose upper portion has been scrapped with a thickness of 5 cm, and compacting the same.

The edge joint (usually 30 cm to 1 m width) of the conventional asphalt road is commonly constructed with cement or concrete, which is cracked over time due to fatigue resistance and moisture sensitivity of the road and adhesion between heterogeneous materials. On the other hand, in the case of using the modified sulfur of the present invention, the construction may be made regardless of a joint portion, and even if the joint portion is independently constructed with common aggregate or waste aggregate, the above-described problem may be solved due to cohesion between homogeneous materials.

In addition, according to an embodiment of the present specification, the concrete composition may be used as materials of a waterproofing agent, an anti-corrosion agent, and the like. The modified sulfur according to an embodiment of the present specification exhibits high functionality, that is, high chemical resistance, corrosion resistance, waterproofness, high strength, high adhesive strength, a quick setting property, and the like. Therefore, the concrete composition may be used as materials of a waterproofing agent, an anti-corrosion agent, a water-stopping agent, various types of adhesives, paint, and the like by enhancing a specific function depending on the area of application.

According to an embodiment of the present specification, when the concrete composition is used as materials of a waterproofing agent and an anti-corrosion agent, a diluent may be further included. According to one embodiment, the diluent may include any one selected from the group consisting of ethanol, methanol, methyl ethyl ketone (MEK), toluene, m-xylene, p-xylene, and the like.

In addition, in the case of use of the concrete composition for corrosion prevention and waterproofing, when an anti-corrosion coating is formed, an additive that may enhance the strength of the anti-corrosion coating may be further included.

The concrete composition according to an embodiment of the present specification may be used in place of epoxy or urethane and is environmentally friendly and economical in terms of time and cost because there is no need to apply a plurality of coats such as a top coat, a middle coat, and a bottom coat like in the case of conventional epoxy or urethane.

Hereinafter, the present invention will be described in detail with reference to embodiments. However, embodiments of the present invention may be modified in several different forms, and the scope of the present invention is not limited to the embodiments to be described below. The embodiments of the present invention are provided so that this disclosure will be thorough and complete, and will fully convey the concept of embodiments to those skilled in the art.

Example 1

Production of Modified Sulfur 100 g of sulfur and 150 g of oleic acid were introduced into a polymerization reactor at room temperature. A temperature of the polymerization reactor was set to about 120° C. using a temperature controller, and melt polymerization was performed while the blade of the reactor was stopped until the sulfur and other mixing materials completely became a liquid and then rotated when the mixture was converted into a liquid. After the melted mixture was converted into a liquid, a temperature of the polymerization reactor was gradually raised by 2° C. to 3° C. to about 135° C. so that a temperature variance inside and outside the synthetic product was as small as possible (about 5° C. or less). When a temperature of the melted mixture was 160° C. or more, the state and viscosity of the melted mixture were measured three times or more per hour, and the reaction was terminated when the viscosity thereof reached 10,000 cP, thereby obtaining modified sulfur.

Comparative Example 1-1

150 g of sulfur and 150 g of dicyclopentadiene (DCPD) were introduced into a polymerization reactor at room temperature. A temperature of the polymerization reactor was set to about 120° C. using a temperature controller, and melt polymerization proceeded until the sulfur and other mixing materials completely became a liquid. After the melted mixture was converted into a liquid that was sufficiently mixed, a temperature of the polymerization reactor was set to about 160° C. and gradually raised to 200° C., and then a reaction was performed. The reaction was terminated when the melted mixture became a dark-brown liquid-phase synthetic product and the viscosity thereof reached 10,000 cP, and the synthetic product was cooled, thereby obtaining solid-phase modified sulfur.

In the case of the modified sulfur produced in Comparative Example 1-1, waterproofness and corrosion resistance can be confirmed. But, when sulfur and DCPD were mixed (in early stage), the sulfur and DCPD had to be mixed while a gas mask was worn due to its disgusting odor, and even after the reaction was terminated, the gas mask had to be worn. Therefore, it is difficult to practically apply this modified sulfur in the industrial field.

Wheel Tracking Test

In order to confirm dynamic stability of the modified sulfur produced in Example 1, 210 g of the modified sulfur produced in Example 1, 2 kg of sand, 1,000 g of aggregate (13 mm), and 210 g of MgO were mixed at room temperature for 7 minutes, and then the mixture was compacted 65 times using a compactor for an asphalt specimen. At 10 minutes after the compaction, a mold was removed, and the compacted mixture was allowed to stand for 12 hours, thereby manufacturing a specimen.

The manufactured specimen, standard straight asphalt manufactured by Twining, Inc. (Comparative Example 1-2), and styrene-butadiene-styrene (SBS) asphalt (Comparative Example 1-3) were subjected to a wheel tracking test at an inspection agency (Twining, Inc., California, USA), and results thereof are shown in FIG. 2.

Looking at the results of FIG. 2, it can be seen that the modified sulfur according to an embodiment of the present specification exhibited excellent dynamic stability compared to straight asphalt and SBS-modified asphalt.

Example 2

In order to confirm that the concrete composition including the modified sulfur according to an embodiment of the present specification can be applied to construct an asphalt road at room-temperature, an experiment was performed as follows.

Example 2-1

150 g of sulfur, 150 g of oleic acid, 2 g of pine oil (phytoncide), 2 g of methyldicyclopentadiene (MDCP), and 2 g of carbon black were introduced into a reactor at room temperature, and melt polymerization was performed while raising a temperature to 160° C., thereby producing liquid-phase modified sulfur having a viscosity of 6,000 cP or more.

1,000 g of aggregate (13 mm), 2 kg of sand, and 150 g of MgO as a hardening agent were mixed at room temperature, and then the mixture was introduced into a fine aggregate mixer. Afterward, 180 g of the produced modified sulfur was introduced into the mixer and mixed for 7 minutes, and then the resulting mixture was compacted 65 times using a compactor for an asphalt specimen. At 10 minutes after the compaction, a mold was removed. One day later, the resulting specimen was put into a hot water tank and immersed in 60° C. water for 1 hour. Afterward, the stability and flow value of the specimen were measured.

As measured at a weight ratio of 1 kg per specimen, the stability and flow value of the specimen were 12,353 and 23, respectively. During the manufacture of the specimen, the odor of sulfur or other additives was hardly sensed.

Example 2-2

150 g of sulfur, 187.5 g of oleic acid, 2 g of pine oil (phytoncide), and 2 g of carbon black were introduced into a reactor at room temperature, and polymerization was performed for 4 hours while raising a temperature to 160° C. Afterward, 2 g of phytoncide was added thereto, and one hour later, the polymerization was terminated when a viscosity reached 15,000 cP or more, thereby producing dark-brown liquid-phase modified sulfur.

1,000 g of aggregate (13 mm), 2 kg of sand, and 270 g of MgO as a hardening agent were mixed at room temperature, and then the mixture was introduced into a fine aggregate mixer. Afterward, 210 g of the produced modified sulfur was introduced into the mixer and mixed for 5 minutes, and then the resulting mixture was compacted 65 times using a compactor for an asphalt specimen. Then, a mold was removed, and at 12 hours after the mold removal, the resulting specimen was put into a hot water tank and immersed in 60° C. water for 1 hour. Afterward, the stability and flow value of the specimen were measured, and results thereof were 15,652 and 18, respectively.

It can be seen that, although the mixing time was reduced in the manufacture of the specimen as compared to Example 2-1, the mixing was performed well. This is because the mixing is performed using a larger amount of the modified sulfur.

Example 2-3

150 g of sulfur, 150 g of oleic acid, 2 g of methyldicyclopentadiene (MDCP), and 2 g of carbon black were introduced into a reactor, and polymerization was performed while raising a temperature to about 160° C. to 200° C. Afterward, 2 g of phytoncide was added thereto, and the polymerization was terminated when a viscosity reached 10,000 cP or more, thereby producing almost black liquid-phase modified sulfur.

The modified sulfur was cooled to obtain rubberized solid-phase modified sulfur, and 200 g of the rubberized solid-phase modified sulfur was crushed into small pieces and diluted with 10 g of ethanol as a diluent to impart fluidity. In addition, 1,000 g of aggregate (13 mm), 2 kg of sand, and 150 g of MgO as a hardening agent were mixed at room temperature, and then the mixture was introduced into a fine aggregate mixer. Afterward, the diluted modified sulfur was introduced into the mixer and mixed for 5 minutes, and then the resulting mixture was compacted 65 times using a compactor for an asphalt specimen. Then, a mold was removed, and at 1 day after the mold removal, the resulting specimen was put into a hot water tank and immersed in 60° C. water for 1 hour. Afterward, the stability and flow value of the specimen were measured, and results thereof were 12,286 and 21, respectively.

In the case of Example 2-3, it can be seen that, although the mixing was performed using a smaller amount of the hardening agent in the fabrication of the specimen, satisfactory stability and a satisfactory flow value were obtained.

Examples 2-1 to 2-3 relates to concrete compositions that are used in asphalt construction at room temperature, and it can be seen from the results of Examples 2-1 to 2-3 that not only brittleness which is the intrinsic disadvantage of sulfur was overcome but also odor was removed and that the concrete composition was environmentally-friendly with room temperature construction and exhibited enhanced durability, which is favorable for maintaining and repairing a road.

Especially, in the case of Example 2-2, it can be seen that the concrete composition was also suitable for emergency repair because hardening was completed in 30 minutes, and the produced modified sulfur also had an aromatic smell of phytoncide.

Example 3

In order to confirm that the concrete composition including the modified sulfur according to an embodiment of the present specification and waste sources can be applied to construct an asphalt road, an experiment was performed as follows.

Example 3-1

750 g of waste glass and 315 g of the modified sulfur produced in Example 1 were mixed with 2,000 g of sand, 750 g of gravel (13 mm), and 225 g of a hardening agent (MgO), and the mixture was compacted 65 times using a compactor for an asphalt specimen. At 24 hours after the compaction, the stability and flow value of the resulting specimen were measured, and results thereof were 39,496 and 26, respectively. The stability value is considerably higher than 2,500 which is a standard stability value of conventional room-temperature asphalt, and this concrete composition can be used in a lower layer part of the road.

Example 3-2

240 g of waste vinyl and 315 g of the modified sulfur produced in Example 1 were mixed with 3,000 g of sand, 1,260 g of gravel (13 mm), and 315 g of a hardening agent (MgO) to manufacture two specimens (A and B), and the specimens were compacted 65 times using a compactor for an asphalt specimen. At 24 hours after the compaction, the stability and flow value of the resulting specimens were measured, and, as a result, the stability values of A and B were 14,641 and 16,515, respectively, and the flow values thereof were 31 and 34, respectively. Since the final compositions of crushed waste plastic were not the same, test scores were obtained for two types, A and B. The stability values of two specimens are also considerably higher than 2,500 which is a standard stability value of conventional room-temperature asphalt, and these concrete compositions can be used in the lower layer part of the road.

Example 3-3

900 g of steelmaking slag and 315 g of the modified sulfur produced in Example 1 were mixed with 3,000 g of sand, 600 g of gravel (13 mm), and 225 g of a hardening agent (MgO), and the mixture was compacted 65 times using a compactor for an asphalt specimen. At 24 hours after the compaction, the stability and flow value of the resulting specimen were measured, and results thereof were 13,292 and 16, respectively. The stability value is considerably higher than 2,500 which is a standard stability value of conventional room-temperature asphalt, and this concrete composition can be used in the lower layer part of the road.

The stability and flow values of the specimens of Examples 3-1 to 3-3 are results measured in accordance with the KS F 2337:2017 test method at Korea Conformity Laboratories.

From the results of Examples 3-1 to 3-3, it can be seen that the modified sulfur according to an embodiment of the present invention was excellent in cohesion, crosslinkability, fluidity, compactability, and storage stability, and thus crushed waste sources can be reused in place of aggregate.

Example 4

The moisture absorption rate of a hydraulic concrete specimen including the modified sulfur produced in Example 1 and a common concrete specimen were compared. The composition of the concrete specimen was designed using a blending ratio in such a way that the concrete had a compressive strength of 25 MPa and a slump of 20 cm, and the blending was carried out based on the blending ratio in accordance with the road pavement repair, bridge pavement and resurfacing guidelines of the Korea Expressway Corporation.

Example 4-1

660 g of Portland cement (Ssangyong cement), 345 g of water, 55 g of the modified sulfur produced in Example 1, and 75 g of a water-reducing agent were mixed, and the mixture, 1,000 g of aggregate (13 mm), and 2 kg of crushed stone sand were introduced into an aggregate mixer and mixed for 10 minutes. Then, the resulting mixture was introduced into a specimen mold. Three days later, the mold was removed, and the resulting specimen was cured for the total of 28 days.

Comparative Example 4-1

A concrete specimen was manufactured in the same manner as in Example 4-1 except that the modified sulfur produced in Example 1 and a water-reducing agent were not included.

15 L of water was introduced into a 20 L plastic barrel, and then each of the concrete specimens manufactured in Example 4-1 and Comparative Example 4-1 was immersed in the barrel. After 1 month of the immersion, a moisture absorption rate was measured, and results thereof are shown in FIG. 3. In addition, the moisture absorption rate measured after 3 months of the immersion is shown in the following Table 1.

TABLE 1

|  | Example 4-1 | Comparative Example 4-1 |
|---|---|---|
| Absorption rate (%) | 0.3 | 2.6 |
| Chemical resistance | O | X |
| Bonding strength (N/cm$^2$) | <200 | X |

From the results shown in Table 1 and FIG. 3, it can be seen that the hydraulic polymer concrete composition including the modified sulfur according to an embodiment of the present specification exhibited a low moisture absorption rate, excellent chemical resistance, and high bonding strength.

Example 5

The chemical resistance of concrete compositions including the modified sulfur according to an embodiment of the present specification were compared.

Examples 5-1 to 5-3

Concrete specimens were manufactured in the same manner as in Example 4-1 except that the weight of the added modified sulfur was 2%, 5%, and 7.5% of cement, respectively.

Comparative Example 5-1

A concrete specimen was manufactured in the same manner as in Example 5-1 except that the modified sulfur was not included.

Each of the concrete specimens manufactured in Examples 5-1 to 5-3 and Comparative Example 5-1 was immersed in each of 30% calcium chloride, 30% sodium chloride, and 30% sulfuric acid, which had been diluted with water, for 9 months. Then, the resulting concrete specimens were compared, and results thereof are shown in FIG. 4.

From the results shown in FIG. 4, it can be seen that the concrete composition including the modified sulfur according to an embodiment of the present specification exhibited superior chemical resistance to that of the concrete composition not including the modified sulfur. Specifically, it can be seen that, even though a relatively small amount of the modified sulfur was included compared to Examples 5-2 and 5-3, Example 5-1 also exhibited superior chemical resistance to that of Comparative Example 5-1 in which the modified sulfur was not included.

The invention claimed is:

1. A method of providing a modified sulfur useful in concrete, asphalt concrete, coatings or sealants, comprising:
   mixing sulfur and a modifier consisting essentially of an unsaturated fatty acid-based modifier,
   introducing the resulting mixture into a reactor and melting the mixture by heating to at least about 120° C. so that the sulfur of the mixture melts to a liquid state,
   polymerizing the resulting liquid sulfur/modifier mixture by raising temperature of the mixture over a period of time, gradually such that exothermic reaction with rapidly rising temperature and carbonization does not occur, to a temperature exceeding 160° C., while stirring the mixture, and
   terminating the reaction at a time when the resulting modified sulfur at room temperature exhibits spinnability or has a network or honeycomb structure,
   the duration of the method being six to 18 hours.

2. A method for producing a concrete composition, comprising producing a modified sulfur by the method of claim 1, and combining the modified sulfur with an aggregate and a hardening agent.

3. The method of claim 2, wherein the hardening agent is magnesium oxide or cement.

4. The method of claim 1, wherein the unsaturated fatty acid-based modifier comprises oleic acid.

5. The method of claim 1, wherein the modified sulfur produced by the method has a viscosity of 4000 cP to 25,000 cP at room temperature.

6. The method of claim 1, wherein the temperature is raised prior to terminating the reaction, to about 180° C.

* * * * *